(12) United States Patent
Lobo

(10) Patent No.: US 8,497,635 B2
(45) Date of Patent: Jul. 30, 2013

(54) LAMP-HOLDING DEVICE AND SYSTEM COMPRISING LAMP-HOLDING DEVICES AND WIRELESS CONTROLLER

(75) Inventor: Rohan Cajetan Lobo, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 727 days.

(21) Appl. No.: 12/373,804

(22) PCT Filed: Jul. 12, 2007

(86) PCT No.: PCT/IB2007/052777
§ 371 (c)(1),
(2), (4) Date: Jan. 14, 2009

(87) PCT Pub. No.: WO2008/012721
PCT Pub. Date: Jan. 31, 2008

(65) Prior Publication Data
US 2009/0322231 A1 Dec. 31, 2009

(30) Foreign Application Priority Data

Jul. 26, 2006 (EP) ..................................... 06117871

(51) Int. Cl.
*H05B 37/02* (2006.01)
*H05B 41/38* (2006.01)

(52) U.S. Cl.
USPC .......................................... 315/152; 315/294

(58) Field of Classification Search
USPC .......................................... 315/149–159, 294
See application file for complete search history.

(56) References Cited

U.S. PATENT DOCUMENTS

| 5,642,104 | A | 6/1997 | Erwin | |
|---|---|---|---|---|
| 6,522,078 | B1* | 2/2003 | Okamoto et al. | 315/149 |
| 6,828,733 | B1* | 12/2004 | Crenshaw | 315/150 |
| 2003/0020595 | A1 | 1/2003 | Wacyk | |
| 2005/0030744 | A1 | 2/2005 | Ducharme et al. | |
| 2006/0012317 | A1* | 1/2006 | Chiu et al. | 315/294 |

FOREIGN PATENT DOCUMENTS

| DE | 4227173 A1 | 2/1995 |
|---|---|---|
| EP | 1408276 A2 | 4/2004 |
| JP | 53084372 A | 7/1978 |
| JP | 02066875 A | 3/1990 |
| JP | 06096865 A | 4/1994 |
| WO | 2003078894 A1 | 9/2003 |
| WO | 2003098977 A1 | 11/2003 |
| WO | 2004039631 A1 | 5/2004 |
| WO | 2004057927 A1 | 7/2004 |
| WO | 2005062680 A1 | 7/2005 |
| WO | 2005099346 A2 | 10/2005 |

* cited by examiner

*Primary Examiner* — Crystal L Hammond
(74) *Attorney, Agent, or Firm* — John F. Salazar; Mark L. Beloborodov

(57) ABSTRACT

The invention relates to a lamp-holding device (1) which is capable of accommodating at least one light source (2) for emitting light. The lamp-holding device comprises a receiver (6) arranged to receive at least one electromagnetic signal (5) from a wireless controller (3). The lamp-holding device further comprises means (7) for sensing the intensity of said received electromagnetic signal and means (8) for controlling said at least one light source in accordance with said sensed intensity of said received electromagnetic signal. By sensing the intensity of the electromagnetic signal of the wireless controller at the lamp-holding device and controlling the behavior of the light source in such a way that it is dependent on the sensed intensity, the position of the wireless controller directly influences the behavior of the light source.

16 Claims, 3 Drawing Sheets

LAMP-HOLDING DEVICE AND SYSTEM COMPRISING LAMP-HOLDING DEVICES AND WIRELESS CONTROLLER

This application is a national stage application under 35 U.S.C. §371 of International Application No. PCT/IB2007/052777 filed on Jul. 12, 2007, and published in the English language on Jan. 31, 2008, as International Publication No. WO/2008/012721, which claims priority to European Application No. 06117871.1, filed on Jul. 26, 2006, incorporated herein by reference.

FIELD OF THE INVENTION

The invention generally relates to the field of illumination of spaces. More specifically, the invention relates to a lamp-holding device which is capable of accommodating a light source for emitting light and a system comprising at least a first and a second lamp-holding device and a wireless controller. The invention also relates to a wireless controller for use in such a system.

BACKGROUND OF THE INVENTION

Spaces, such as living rooms, generally comprise a plurality of lamps which are capable of illuminating the space. Each of these lamps often has its own means for controlling the behavior of the lamp, such as the intensity of the light emitted from the lamp.

In recent years, lamps have become available that can be controlled by means of wireless, remote control. The wireless controller emits an electromagnetic signal, e.g. an infrared (IR) signal or a radio-frequency (RF) signal, which controls the behavior of the lamp. To this end, the lamp-holding device comprises a receiver which is capable of receiving the electromagnetic signal from the wireless controller. Typically, each lamp has its own wireless controller.

JP 2066875 discloses a plurality of illumination fixtures that can be controlled as a group from a remote control part. The remote control part comprises a built-in light sensor. The remote control part is installed in a place to be illuminated and the illumination is sensed by the sensor. Upon comparison with a target luminance value, a command signal is transmitted from the remote control part to a receiver of the illumination fixture so as to dim the light source in the illumination fixture.

The light emitted from the light source in JP 2066875 is not directly dependent on the position of the remote control part. If the environmental light conditions at the remote control part change, the light emitted from the light source changes, while a change of the position of the remote control part will not influence the light emitted from the light source when the light sensed by the built-in sensor remains the same.

OBJECT AND SUMMARY OF THE INVENTION

It is an object of the invention to provide an improved lamp-holding device and a system for illuminating a space, wherein the behavior of the light source is truly dependent on the position of the wireless controller.

To this end, a lamp-holding device is proposed, which is capable of accommodating at least one light source for emitting light. The lamp-holding device comprises a receiver arranged to receive at least one electromagnetic signal from a wireless controller. The lamp-holding device further comprises means for sensing the intensity of said received electromagnetic signal and means for controlling said at least one light source in accordance with said sensed intensity of said received electromagnetic signal.

Moreover, a system is proposed, which comprises at least a first lamp-holding device and a second lamp-holding device located at different positions and being capable of accommodating at least a first light source and a second light source, respectively, for emitting light. The system further comprises a wireless controller arranged to emit at least one electromagnetic signal for said first and second lamp-holding device. The first and second lamp-holding devices are arranged to sense a first and a second intensity, respectively, of said electromagnetic signal from said wireless controller. The system is arranged to control said at least one first light source in accordance with said first sensed intensity of said electromagnetic signal and to control said at least one second light source in accordance with said second sensed intensity of said electromagnetic signal.

The intensity of the electromagnetic signal of the wireless controller at a particular point varies with the distance between the wireless controller and that point. By sensing the intensity of the electromagnetic signal of the wireless controller at the lamp-holding device and controlling the behavior of the light source in such a way that it is dependent on the sensed intensity, the position of the wireless controller directly influences the behavior of the light source. For multiple lamp-holding devices at different positions, this results in the user being capable of individually controlling the behavior of the light sources with a single wireless controller by changing the distance between the lamp-holding devices and the wireless controller. The invention allows a user to control e.g. the intensity of a light source with respect to the intensity of the surrounding light sources. As an example, a user finding himself in a room that is partly lit up by the sun may take the wireless controller to the shady side of the room and set the intensity of the light sources at the shady side at a higher level than at the sunny side. The sensor for sensing the electromagnetic signal is preferably not sensitive to environmental light and, consequently, environmental light does not influence the behavior of the light source.

The embodiments of the invention as defined in claims 2 and 11 are advantageous in that the lamp-holding device is itself arranged to determine the desired behavior of the light source resulting from the sensed intensity of the electromagnetic signal.

The embodiments of the invention as defined in claims 3, 4 and 12 enable the at least one light source of a lamp-holding device to be controlled while taking the intensity of the electromagnetic signal received by further lamp-holding devices into account. Such an embodiment allows e.g. calibration of the system comprising a plurality of lamp-holding devices.

In the embodiment of the invention as defined in claim 5, the number of further lamp-holding devices for which the intensity of the electromagnetic signal from the wireless controller is taken into account is limited to adjacent or neighboring lamp-holding devices in order to control the behavior of the light source of a lamp-holding device.

The embodiments of the invention as defined in claims 6 and 13 avoids the need to provide the lamp-holding device with means for processing the sensed intensity of the electromagnetic signal from the wireless controller. If a two-way communication system between the lamp-holding device and the wireless controller can be established, the data regarding the sensed intensity of the electromagnetic signal may be transmitted to the wireless controller and, by means of a further control signal, the wireless controller may determine the resulting behavior of the light source. The further control signal may again be sensed at the lamp-holding device. The processing functions of the wireless controller may be more advanced and may further avoid communication between the lamp-holding devices.

The embodiments of the invention as defined in claims 7 and 14 provide a further sensor for environmental light, such as daylight or light from the light sources. The output of this sensor may further be taken into account for determining the behavior of the light source.

The embodiments of the invention as defined in claims 8, 9 and 15 define examples of the behavior of the light sources (light intensity, color) that can be controlled in dependence on the sensed intensity.

Finally, the invention relates to a wireless controller comprising at least one control means and an electromagnetic signal emitter for use in the system described above. The wireless controller may be further arranged to receive a first sensed intensity from a first lamp-holding device and a second sensed intensity from a second lamp-holding device. In such an embodiment, the signals can be processed in the wireless controller. From a cost-perspective point of view, it may be advantageous to implement the control logic in the wireless controller instead of in each lamp-holding device. Furthermore, communication between the lamp-holding devices may be avoided.

It should be noted that the subject matter of one or more of the claims, or aspects thereof, may be combined.

The invention will be further illustrated with reference to the accompanying drawings, which schematically show preferred embodiments according to the invention. It will be understood that the invention is not in any way limited to these specific and preferred embodiments.

DESCRIPTION OF EMBODIMENTS

Figure 1:
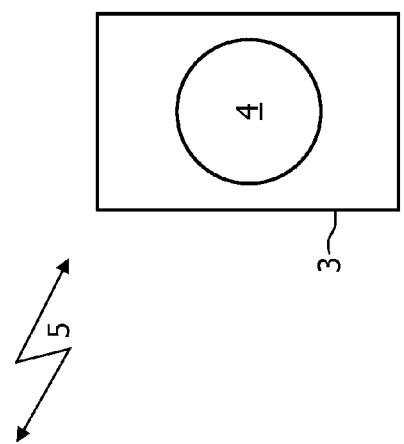
FIG. 1 is a schematic illustration of a lamp-holding device comprising a light source and a wireless controller in accordance with a first embodiment of the invention.
Figure 1:
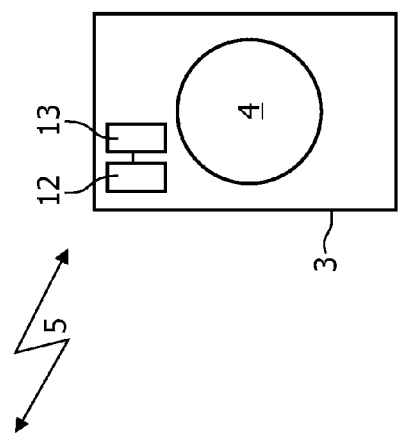
Figure 2:
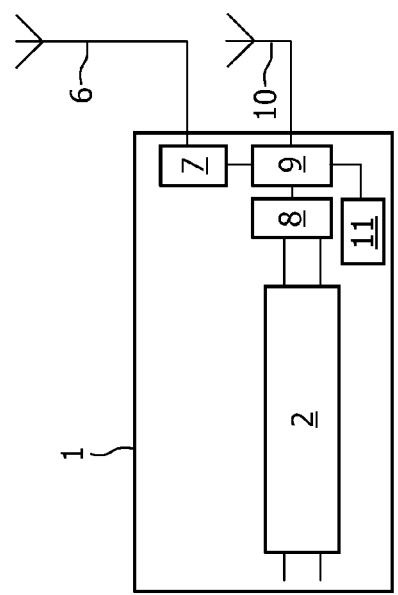
FIG. 2 is a schematic illustration of a lamp-holding device comprising a light source and a wireless controller in accordance with a second embodiment of the invention.
Figure 2:
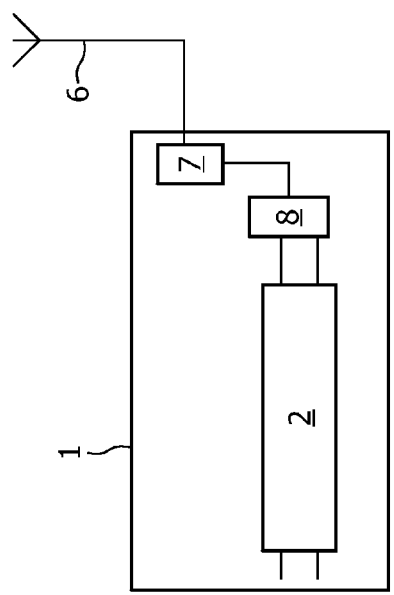

FIGS. 1 and 2 shows a lamp-holding device 1 comprising a light source 2 and a wireless controller 3 comprising a control means 4, such as a wheel or a button. The lamp-holding device 1 and the wireless controller 3 may communicate via electromagnetic signals 5, such as infrared (IR) signals or radio-frequency signals (RF).

The lamp-holding device 1 may be e.g. a device to be attached to a ceiling or to be positioned on a surface, such as a floor or a desk. Although the functionality is implemented in the lamp-holding device 1 in the present description of the embodiments of the invention, it will be evident to those skilled in the art that one or more of the functions may be implemented elsewhere, e.g. in the light source 2.

The light source 2 may be e.g. an incandescent lamp, one or more light-emitting diodes or any other type of light source whose behavior can be varied (e.g. intensity and/or color).

The lamp-holding device 1 shown in FIGS. 1 and 2 comprises a receiver 6 arranged to receive the electromagnetic signal 5 from the wireless controller 3. The lamp-holding device 1 further comprises a sensor 7 for sensing or determining the intensity of the electromagnetic signal 5. The sensor 7 is preferably selectively sensitive to the electromagnetic signal 5 of the wireless controller 2. The sensor 7 will preferably not sense any environmental light or environmental light changes and therefore senses or measures solely intensity changes of the electromagnetic signal 5.

The lamp-holding device 1 also has means 8, such as a controller (e.g. a variostat control), for controlling the light source 2, e.g. the intensity of the light to be emitted or the color of the light.

The lamp-holding device 1 shown in FIG. 1 comprises means 9 for relating or processing the sensed intensity of the electromagnetic signal 5 by the sensor 7 to a control value so as to command the controller 8 to control the behavior of the light source 2. To this end, the lamp-holding device 1 may contain e.g. a look-up table so as to relate a particular sensed intensity of the electromagnetic signal 5 to a corresponding control value for the controller 8. The behavior of the light source 2 is directly dependent on the intensity of the received electromagnetic signal 5 and, consequently, on the distance between the lamp-holding device 1 and the wireless controller 3.

Figure 3A:
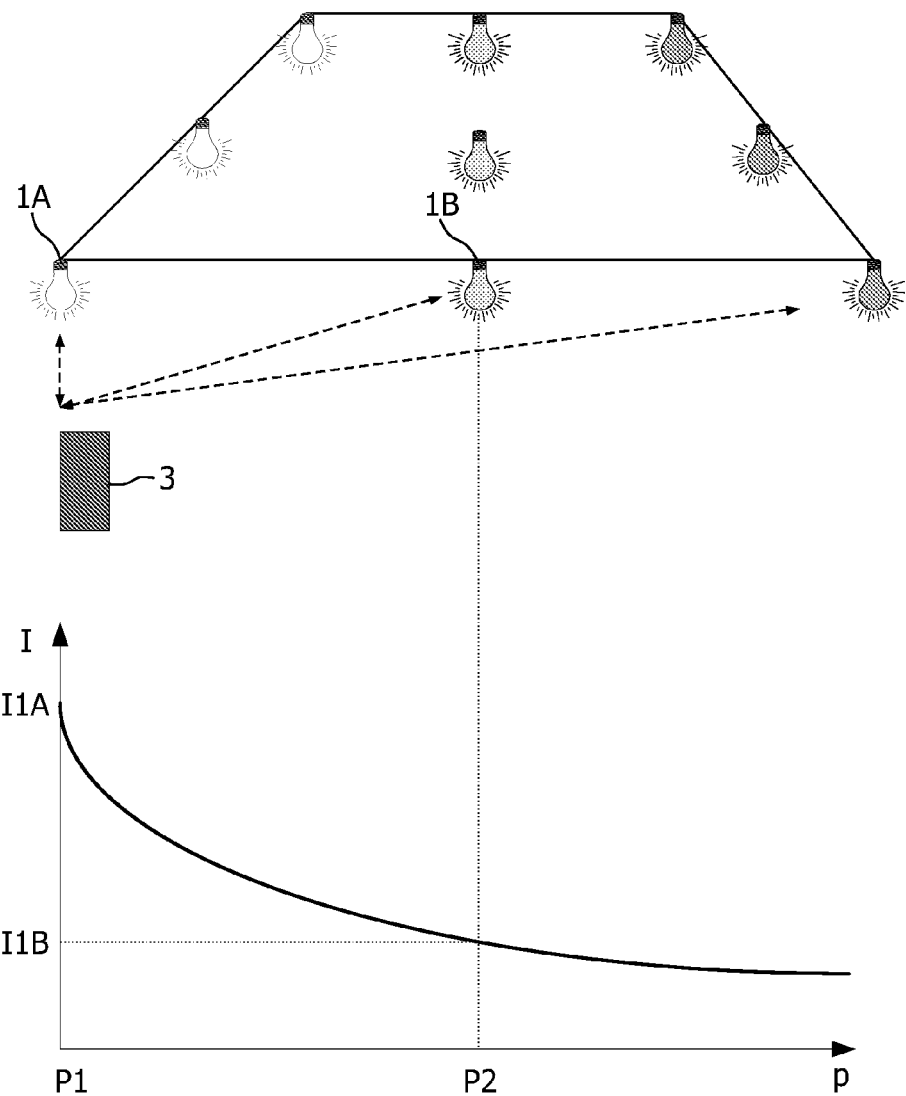
FIGS. 3A and 3B are schematic illustrations of a wireless controller moving in a space comprising a plurality of lamp-holding devices as shown in FIG. 1.
Figure 3B:
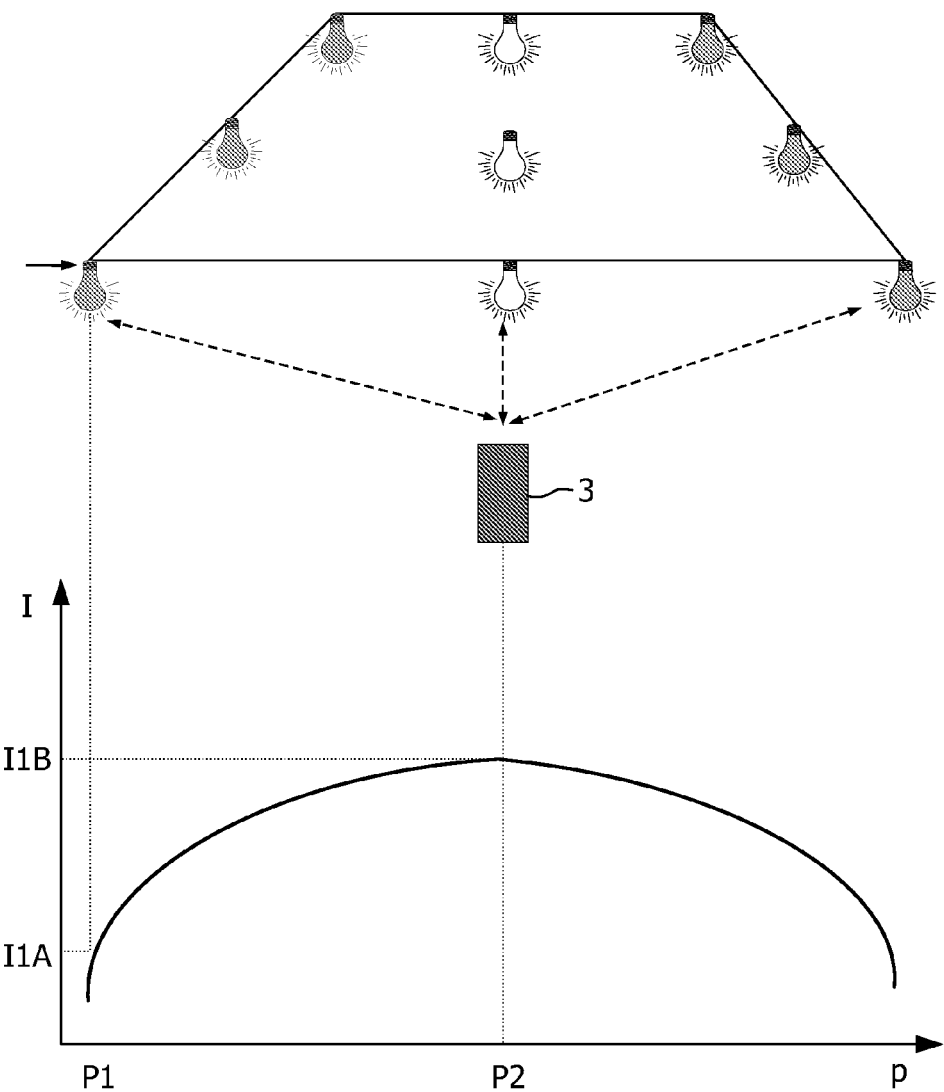

The lamp-holding device 1 further comprises a receiver 10 for receiving signals including data regarding the intensity sensed by further lamp-holding devices 1, such as those shown in FIGS. 3A and 3B. This data may be processed by the means 9 as well, and the light source 2 may be controlled from the controller 8 in accordance with both the electromagnetic signal intensity sensed directly by the sensor 7 and the intensity sensed by one or more further lamp-holding devices 1 and received at the receiver 10.

Information regarding the environmental light conditions obtained by the sensor 11 may further be taken into account by the means 9.

It will be evident to those skilled in the art that the receiver 10 and the sensor 11 may be omitted from the lamp-holding device. Furthermore, it will be evident that the functions assigned to the receiver 6, sensor 7, controller 8 and processing means 9 may be combined in one or more devices.

Instead of processing the data of the sensed intensity of the electromagnetic signal 5 at the lamp-holding device 1, there may be circumstances wherein it is more economic to provide at least a portion of the processing functionality in the wireless controller 3. This embodiment is illustrated schematically in FIG. 2. Such an embodiment of the system may be particularly advantageous when a large number of lamp-holding devices 1 is applied. Moreover, the wireless controller 3 may comprise more advanced functionalities and may further avoid or reduce the need for the lamp-holding devices to communicate with each other.

In the embodiment shown in FIG. 2, the data regarding the sensed intensity of the electromagnetic signal 5 is transmitted to the wireless controller 3 wherein the data is received at a receiver 12. The data are processed by a means 13 in order to determine a new control signal to be sent to the receiver 6. The controller 8 uses this new control signal to determine the behavior of the light source 2. Apart from controlling the light source 2, the intensity of the new control signal may be sensed and the process described above can be repeated.

The embodiment shown in FIG. 2 assumes the presence of a two-way communication system between the lamp-holding device 1 and the wireless controller 3. An example of such a two-way communication protocol is ZigBee.

It should be noted that the behavior of the light source 2 is not necessarily linearly dependent on the sensed intensity of the electromagnetic signal, but may instead be a step function or any other type of dependency. This dependency can be programmed in the processing means 9, 13.

FIGS. 3A and 3B illustrate an example of operation of the system using the lamp-holding device 1 and wireless controller 3 shown in FIG. 1. The top part of FIGS. 3A and 3B illustrates an array of lamp-holding devices 1 comprising light sources 2 attached to a ceiling of a room. The lower part of the Figures shows the light intensity I as a function of the position p in the room.

In FIG. 3A, the wireless controller 3 is placed at a position P1 at the left side of the room. The distance to the lamp-holding device 1A is smaller than the distance to the lamp-holding device 1B of the array of lamp-holding devices 1. When the user operates the control means 4 on the wireless controller 3, the wireless controller 3 emits an electromagnetic signal. Since the distance between the lamp-holding device 1A and the wireless controller 3 is smaller than the distance between the lamp-holding device 1B and the wireless controller 3, the sensor 7 of the lamp-holding device 1A senses a larger intensity than the sensor 7 of the lamp-holding device 1B. Consequently, the processing means 9 of the lamp-holding device 1A instructs the controller 8 of the lamp-holding device 1A to control the light source of the lamp-holding device 1A so as to emit light at a higher intensity I1A than the processing means of the lamp-holding device 1B does for the controller 8 of the lamp-holding device 1B. The controller 8 of the lamp-holding device 1B instructs the light source to emit light at an intensity I1B, as shown in the graph in the lower part of FIG. 3A. When the lamp-holding devices 1A and 1B communicate the respective sensed intensities for the electromagnetic signal 5 to each other, the light source 2 of the lamp-holding device 1A may emit light at an intensity I1A of 100% (because this lamp-holding device receives the highest intensity of the electromagnetic signal 5), while the light source 2 of the lamp-holding device 1B emits light at an intensity I1B=(intensity of signal 5 at device 1B/intensity of signal 5 at device 1A)*I1A.

In FIG. 3B, the wireless controller 3 is moved to position P2 and the control means 4 is again operated. The sensor 7 of the lamp-holding device 1B now senses a higher intensity of the electromagnetic signal 5 than in the situation shown in FIG. 3A, while the sensor 7 of the lamp-holding device 1A now senses a lower intensity than in the situation shown in FIG. 3A. Consequently, the intensity I1B of the light emitted by the light source 2 of the lamp-holding device 1B increases, whereas the intensity I1A of the light emitted by the light source 2 of the lamp-holding device 1A decreases (dimming) as a result of the movement of the wireless controller 3 from position P1 to position P2. The behavior of the light sources 2 of the lamp-holding devices 1A and 1B is thus directly dependent on the position P of the wireless controller 3.

It should be noted that communication between the lamp-holding devices 1A and 1B may not be necessary. Each lamp-holding device 1A, 1B may be capable of sensing the intensity of the electromagnetic signal 5 and relating the sensed intensity to an appropriate control signal for the light source 2 for each lamp-holding device 1A, 1B individually.

Furthermore, it is to be noted that the behavior of the light sources 2 is not limited to the example shown in FIGS. 3A and 3B. The behavior of the light sources of the different lamp-holding devices may e.g. be such that the closer the wireless controller 3 is to a lamp-holding device 1, the lower the intensity I of the light emitted from the light source 2. Alternatively, or in addition, the color of the light emitted by the light source 2 may be made dependent on the position P of the wireless controller 3.

Finally, the lamp-holding device 1 and the wireless controller 3 may be used in the situation shown in FIGS. 3A and 3B. In this situation, the sensed intensities of the electromagnetic signal 5 are processed in the wireless controller 3.

In the claims, any reference signs placed between parentheses shall not be construed as limiting the claim. Use of the verb "comprise" and its conjugations does not exclude the presence of elements or steps other than those stated in a claim. Use of the article "a" or "an" preceding an element does not exclude the presence of a plurality of such elements. The mere fact that certain measures are recited in mutually different dependent claims does not indicate that a combination of these measures cannot be used to advantage.

The invention claimed is:

1. A lamp-holding device for accommodating at least one light source for emitting light, the lamp-holding device comprising:
    a receiver arranged to receive at least one electromagnetic signal from a wireless controller and in communication with a sensor;
    control logic connected to said sensor to relate value of the intensity of said received electromagnetic signal received by the receiver,
    wherein the value of the intensity of the received electromagnetic signal is related to a distance of the wireless controller from the receiver; and
    a controller controlling said at least one light source in accordance with said value of the sensed intensity of said received electromagnetic signal.

2. The lamp-holding device according to claim 1, wherein said lamp-holding device is arranged to include the control logic to process said sensed intensity of said electromagnetic signal for controlling said at least one light source in accordance with said sensed intensity of said received electromagnetic signal.

3. The lamp-holding device according to claim 1, wherein said lamp-holding device further comprises a second receiver for receiving at least one signal from at least one auxiliary lamp-holding device, said signal including data representing the intensity of at least one received electromagnetic signal by said auxiliary lamp-holding device from said wireless controller.

4. The lamp-holding device according to claim 3, wherein said lamp-holding device is further arranged to process said data for controlling said at least one light source in accordance with said processed data representing the intensity of at least one received electromagnetic signal by said auxiliary lamp-holding device from said wireless controller.

5. The lamp-holding device according to claim 3, wherein said lamp-holding device is arranged to receive said data from at least one adjacent auxiliary lamp-holding device for controlling said at least one light source in accordance with the relative intensity of said electromagnetic signal received by said lamp-holding device and said at least one adjacent auxiliary lamp-holding device from said wireless controller.

6. The lamp-holding device according to claim 1, wherein said lamp-holding device is further arranged to transmit data representing the intensity of said electromagnetic signal received by said lamp-holding device and/or at least one auxiliary lamp-holding device from said wireless controller.

7. The tamp-holding device according to claim 1, wherein said at least one light source is capable of emitting light of various intensities, and said controller is arranged to control the intensity of said emitted light in accordance with said sensed intensity of said received electromagnetic signal.

8. The lamp-holding device according to claim 1, wherein said lamp-holding device is capable of accommodating a plurality of light sources which are capable of emitting light of different colors, and said controller arranged to control the color of light emitted from said light sources in accordance with said sensed intensity of said received electromagnetic signal.

9. A system comprising:
at least a first lamp-holding device and a second lamp-holding device capable of accommodating at least a first light source and a second light source, respectively, for emitting light;
a wireless controller arranged to emit at least one electromagnetic control signal for said first and second lamp-holding device,
wherein said first and second lamp-holding devices are arranged to sense a first intensity and a second intensity of said electromagnetic signal from said wireless controller,
wherein the first intensity is related to the distance of the wireless controller to the first lamp holding device,
the second intensity is related to the distance of the wireless controller to the second lamp holding device and
said system is arranged to control said at least one first light source in accordance with said first value of the sensed intensity of said electromagnetic signal and said at least one second light source in accordance with said second value of the sensed intensity of said electromagnetic signal.

10. The system according to claim 9, wherein said first lamp-holding device and said second lamp-holding device are arranged to process said first sensed intensity and said second sensed intensity, respectively, and include a controller to control said at least one first light source in accordance with said first sensed and processed intensity and said at least one second light source in accordance with said second sensed and processed intensity.

11. The system according to claim 9, wherein at least said first lamp-holding device is arranged to receive at least one signal from said second lamp-holding device, said signal including data regarding the intensity of at least one electromagnetic signal sensed by said second lamp-holding device from said wireless controller, and said system is arranged to control said at least one first light source in accordance with said first sensed intensity and said intensity of said electromagnetic signal sensed by said second lamp-holding device.

12. The system according to claim 9, wherein said first lamp-holding device and said second lamp-holding device are arranged to transmit data regarding the sensed intensity of at least one electromagnetic signal received by said first and second lamp-holding devices from said wireless controller to said wireless controller, and said wireless controller is arranged to process said data regarding said first and second sensed intensity and to control said at least one first light source in accordance with said first sensed and processed intensity and said at least one second light source in accordance with said second sensed and processed intensity.

13. The system according to claim 9, wherein at least one of said first and second lamp-holding devices further comprises a sensor for sensing light conditions in its environment, and said system is further arranged to take said light conditions into account in controlling said at least one first and second light source.

14. The system according to claim 9, wherein said at least one first and second light source is capable of varying at least one of a light intensity and a light color of said emitted light, and said system is arranged to control at least one of the intensity of said emitted light and the color of said emitted light in accordance with said sensed intensity of said electromagnetic signal.

15. A system for controlling light sources using a first lamp holding device and a second lamp holding device, comprising:
a first lamp-holding device and a second lamp-holding device each having at least a first light source and a second light source, respectively, for emitting light;
a wireless controller arranged to emit at least one electromagnetic control signal, the at least one electromagnetic signal capable of being received by the first lamp-holding device and the second lamp-holding device;
the first lamp-holding device having a first sensor to determine a first intensity of the electromagnetic signal from said wireless controller, the first intensity being related to the distance of the controller to the first lamp-holding device,
the second lamp-holding devices having a second sensor to determine a second intensity of said electromagnetic signal from said wireless controller, the second intensity related to the distance of the controller to the second lamp holding device and
the system arranged to control the at first light source in accordance with the intensity of the electromagnetic signal and the second light source in accordance with the second intensity of the electromagnetic signal;
wherein the first lamp-holding device is arranged to receive a signal from the second lamp-holding device, the signal from the second lamp-holding device including data regarding the intensity the electromagnetic signal sensed by the second lamp-holding device from the wireless controller; and
the system operable to control the first light source in accordance with the first intensity and the intensity of said electromagnetic signal sensed by the second lamp-holding device.

16. A lamp-holding device, comprising:
a receiver positioned in the lamp holding device operable to receive a signal from a wireless controller;
a sensor in the lamp holding device in electrical communication the receiver;
control logic in the lamp holding device connected to the sensor to process the sensed intensity of the electromagnetic signal received at the receiver;
the control logic operable to derive a control value based on the sensed intensity of the electromagnetic signal and representative of a distance from the wireless controller the receiver is located;
a controller operably connected to the control logic and in electrical controlling communication with at least one light source in the lamp holding device controlling the at least one light source in accordance with the derived control value.

* * * * *